H. F. KRANTZ.
METER PANEL.
APPLICATION FILED JAN. 23, 1913. RENEWED AUG. 29, 1917.
1,277,321.
Patented Aug. 27, 1918.
3 SHEETS—SHEET 1.
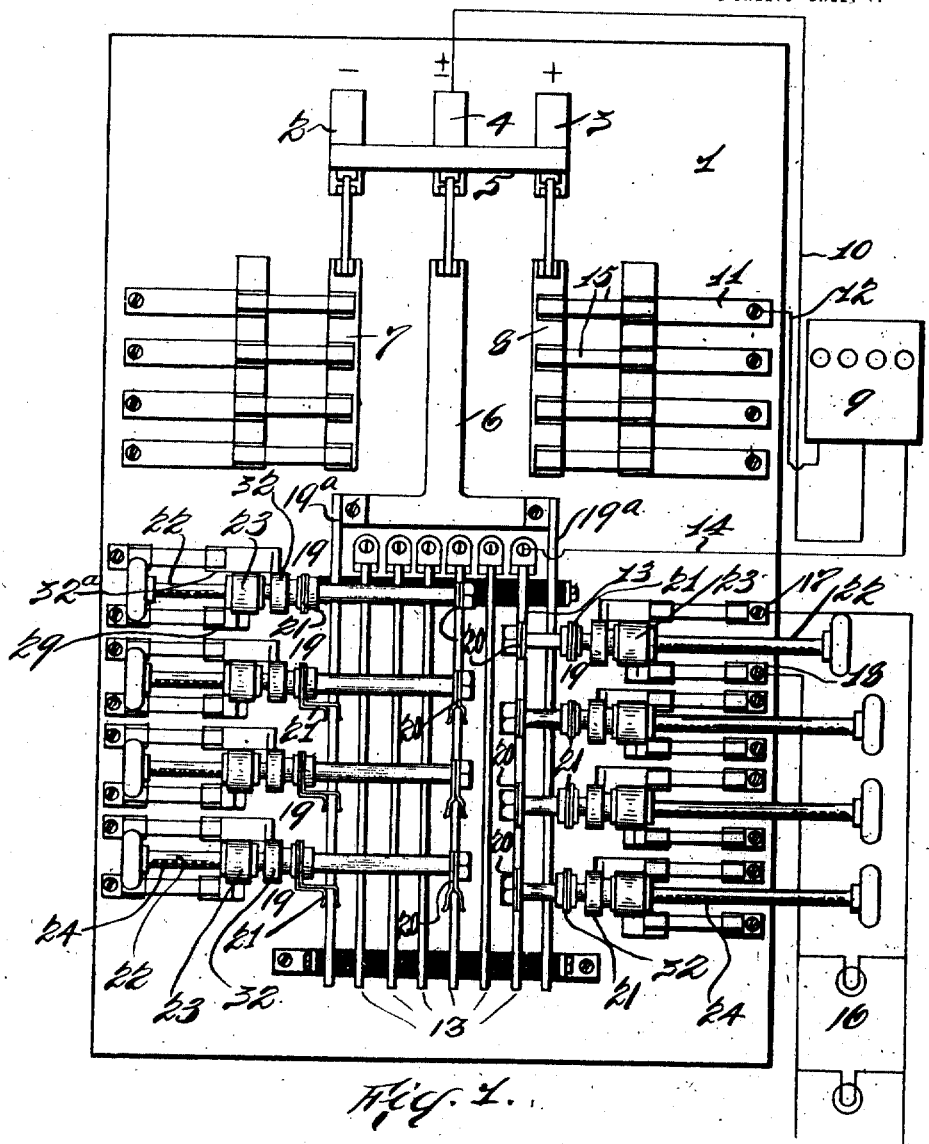

H. F. KRANTZ.
METER PANEL.
APPLICATION FILED JAN. 23, 1913. RENEWED AUG. 29, 1917.
1,277,321.
Patented Aug. 27, 1918.
3 SHEETS—SHEET 2.
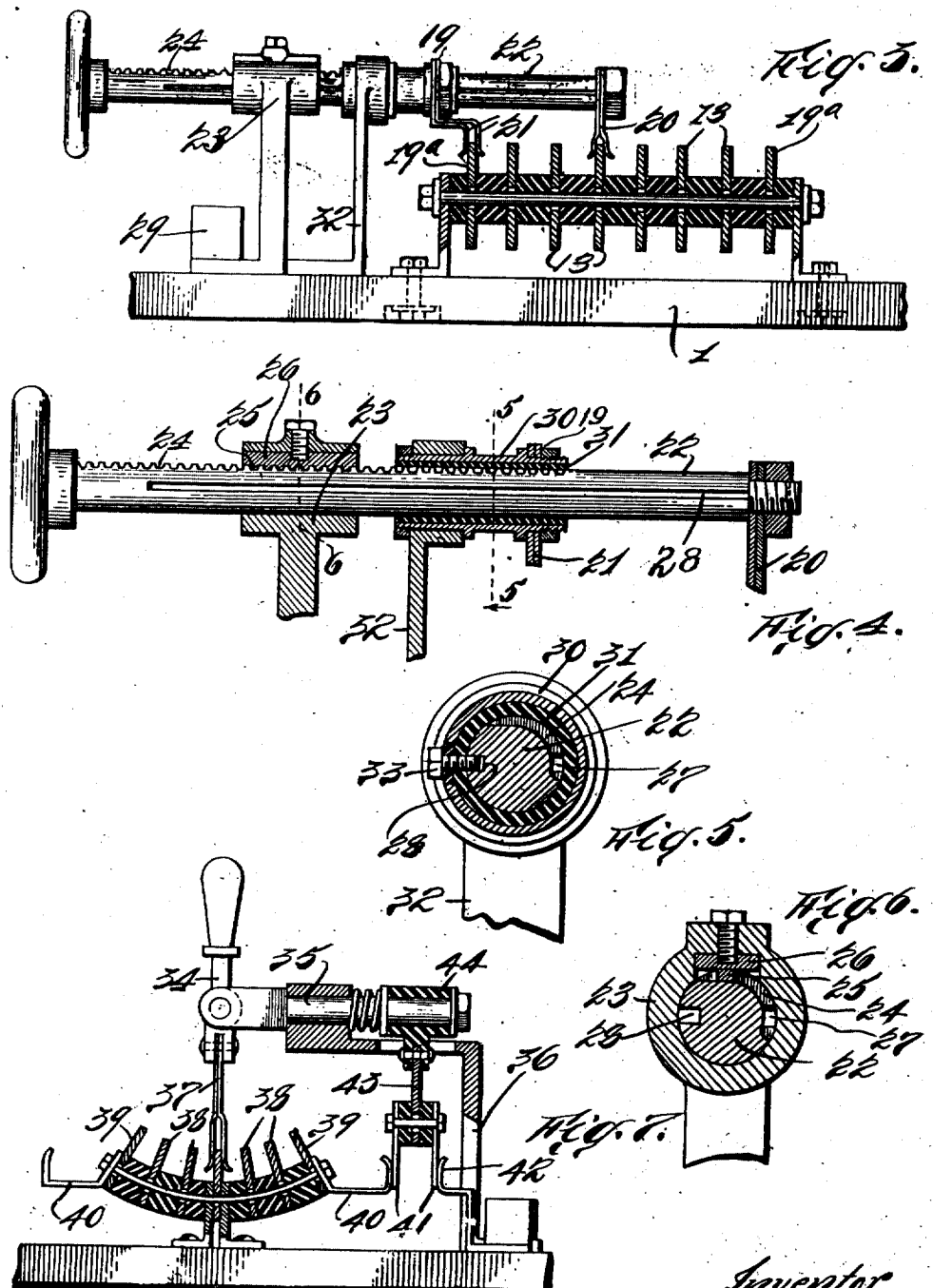

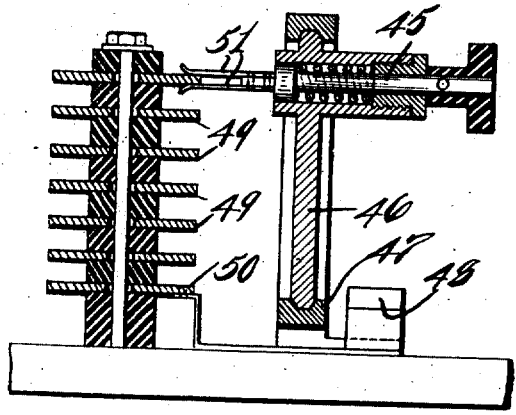
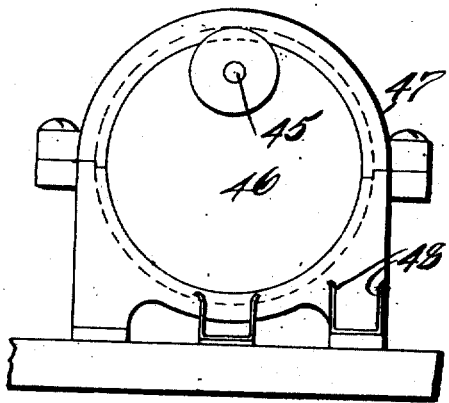
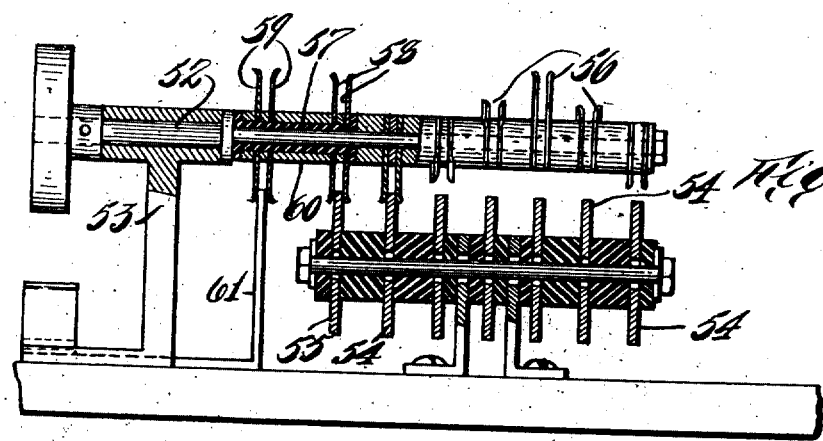
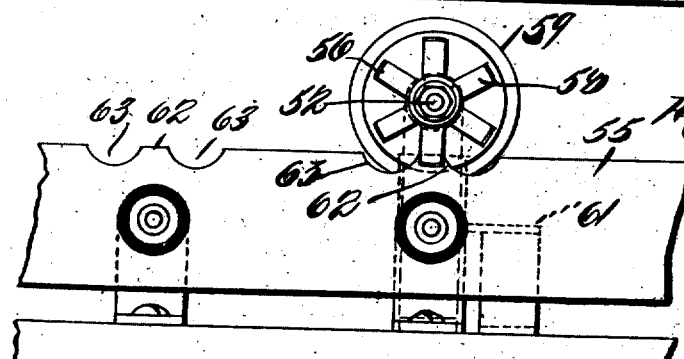

UNITED STATES PATENT OFFICE.

HUBERT F. KRANTZ, OF BROOKLYN, NEW YORK, ASSIGNOR TO KRANTZ MANUFACTURING COMPANY, INC., OF BROOKLYN, NEW YORK, A CORPORATION OF NEW YORK.

METER-PANEL.

1,277,321.     Specification of Letters Patent.     Patented Aug. 27, 1918.

Application filed January 23, 1913, Serial No. 743,700. Renewed August 29, 1917. Serial No. 188,868.

*To all whom it may concern:*

Be it known that I, HUBERT F. KRANTZ, a citizen of the United States, residing at Brooklyn, in the county of Kings, city and State of New York, have invented certain new and useful Improvements in Meter-Panels, of which the following is a clear, full, and exact description.

This invention relates to an improvement in meter panels.

The object of the invention is to provide a meter panel which is simple in construction, positive in action, and in which a greater range of operation may be obtained than in those now in use.

A further object is to provide improved means for contacting any selected meter bar while by the same movement contacting a contact member of opposite polarity.

A further and more detailed object is to provide two branch circuit terminals, to provide supporting means whereby one of said terminals may be adjusted relatively to the other so as to stand adjacent a selected meter bar, and to provide means whereby both terminals may thereafter be moved into contacting relation with their respective adjacent bars.

A further object is to provide means for preventing movement of either of the terminal or contact members except when the adjustable terminal is in the correct position for engaging a selected meter bar.

A further object is to provide supporting means for the terminal or contact members adapted to support the adjustable terminal in such relation to a gang of meter bars that said adjustable terminal may be readily moved transversely across and above the gang of meter bars to its desired position, and in full and clear view of the operator.

A further object is to so arrange the parts that a plurality of branch line terminals may be supported at opposite sides of the gang of meter bars, and the adjustable terminals at one side be staggered with respect to those at the other side so that each may have unobstructed access to all of the meter bars in a minimum of length of meter bar.

Other objects and aims of the invention, more or less specific than those referred to above, will be in part obvious and in part pointed out in the course of the following description of the elements, combinations, arrangements of parts and applications of pinciples, constituting the invention; and the scope of protection contemplated will be indicated in the appended claims.

In the accompanying drawings which are to be taken as a part of this specification, and in which I have shown merely a preferred form of embodiment of the invention:—

Figure 1 illustrates a plan view of an embodiment of my invention.

Fig. 2 is a partial side view thereof.

Fig. 3 is an enlarged side elevation of one of the switches, the adjacent meter and neutral bars being shown in section.

Fig. 4 is an enlarged longitudinal sectional view of the switch.

Fig. 5 is an enlarged cross sectional view, the section being taken on a line 5—5 in Fig. 4.

Fig. 6 is a similar view taken on a line 6—6 in Fig. 4.

Fig. 7 is a sectional view partly in elevation of a modified form of switch.

Fig. 8 is a sectional view of still another form of switch.

Fig. 9 is an end view thereof.

Fig. 10 is a sectional view of still another form of switch.

Fig. 11 is an end view thereof, one of the neutral bars being also shown.

Referring to the drawings for describing in detail the structure which is illustrated therein, and referring first to Figs. 1 to 6 inclusive, the reference character 1 indicates a base plate which is usually of slate or similar insulating material.

Main switch contact terminals 2, 3 and 4 are mounted upon the face of the plate 1 and a three blade switch 5 is disposed for connecting said terminals with the three bars 6, 7 and 8.

A meter 9 (only one being illustrated in the drawings) is connected to the neutral contact 4 by a wire 10. A wire 12 leads from the meter to a terminal 11 and a wire 14 leads from the meter to a meter bar 13. The usual fuse 15 is interposed in the meter circuit between the bar 8 and the terminal 11.

It will be understood of course that there may be any desired number of the terminals 11 for the bars 7 and 8 and there is a separate fuse 15 for each terminal 11.

The reference numeral 16 indicates a branch circuit which is connected with the branch circuit contacts 17 and 18. There may be any number of these branch circuits and each is controlled by a novel form of selective switch mechanism 19.

As clearly seen in Fig. 1 the central, or neutral, bar 6 is connected with a pair of neutral bus bars 19ᵃ which are spaced apart in substantially parallel relation. In the space between these neutral bus bars is arranged any number of meter bus bars 13 parallel with each other and with the neutral bus bars, all being insulated from each other by suitable insulating spacers as best seen in Fig. 3.

The switches 19 include an adjustable or selector contact 20 and a non-adjustable contact 21. The selector contacts 20 are carried upon a rod 22 which is slidably mounted in a support 23 so that said selector contacts may be readily slid back and forth transversely of the gang of meter bars 13 into a position above any selected one of said meter bars. The contacts 21 are arranged to cooperate with the neutral bus bars 19ᵃ.

The neutral bus bar 19ᵃ at one side of the gang of meter bars is adapted to be engaged by the contacts 21 of the switches 19 adjacent that bus bar while the opposite bus bar 19ᵃ performs the same function for the switches at the opposite side of the gang.

All of the switches 19 are identical in construction and operation and in each the slide rod 22 is adapted to be rotated within the support 23 for swinging the contacts 20 and 21 into and out of contacting position. The blade 20 may be translated into position above any desired meter bar and then rotated in that particular position while the blade 21 rotates with the blade 20 but without translation.

The blade 21 is fixed to a sleeve 30 which is rotatably mounted within a separate support 32 and through which the slide rod 22 is freely longitudinally movable. The pin or screw 33 is carried by the sleeve 30 and engages within a groove 28 formed longitudinally in the slide rod 22 so that said sleeve at all times rotates with the slide rod. Suitable insulating material 31 is interposed to prevent flow of current between the sleeve and the slide rod.

The function of each switch 19 is to close the branch circuit which it represents between one of the neutral bus bars 19ᵃ and a selected one of the meter bars 13 in order that any one of the meters can be thrown in the branch circuit controlled by that switch.

In order to prevent sliding movement of the slide rod 22 except when the contact 20 thereof is in the "off" position, a series of transverse grooves 24 is formed in the surface of the slide rod and the teeth 25 of a locking block 26 carried by the support 23 engage within said grooves at all times except when the contact 20 is in the full "off" position. When the contact 20 is in the full "off" position the teeth 25 stand within a longitudinal groove 27 formed in the slide rod in communication with all of the transverse grooves. While the teeth 25 are in the groove 27 the slide rod may be moved back and forth at will but a partial rotation of the slide rod to move the contact 20 toward the "on" position will cause the teeth 25 to enter the transverse grooves and immediately prevent further longitudinal movement.

As best seen in Figs. 5 and 6 the transverse grooves extend throughout approximately one-quarter of the circumferential surface of the slide rod, thus permitting approximately a one-quarter rotation of the slide rod.

Obviously the transverse grooves 24 may be spaced to correspond with the space between the meter bars 13 so that the contact 20 may not be swung toward "on" position except when in correct register with a selected meter bar.

From this construction it will be seen that the contacts 20 and 21 will at all times move together into "on" or "off" positions and that both are in the "off" position during any selective adjustment of the contact 20.

The supports 23 and 32 are provided with fuse clips 29 and 32ᵃ by means of which suitable fuses may connect said supports with the branch circuit contacts 18 and 17 respectively.

Fig. 7 illustrates a modified form of switch mechanism which embodies somewhat the same principle as above described. In this instance an arm 34 is mounted for universally swinging by means of a rotatable shaft 35 which is supported in a standard 36. The standard 36 comprises one of the branch circuit terminals. The arm 34 carries a switch blade 37 disposed for swinging into and out of engagement with the meter bars 38. The meter bars are arranged in arcuate disposition, the radius point of which is coincident with the pivot of the arm 34 in the shaft 35.

The neutral bus bars 39 carry contacts 40 and neutral switch blades 41 are connected to the shaft 35 to swing into and out of position bridging between said movable contacts 41 and branch circuit contacts 42. The neutral switch blades are carried by an arm 43 which is connected with the shaft 35 by means of an insulating collar 44.

In operating, the arm 34 may be rotated to swing the blade 37 out of engagement with a meter bar and at the same time the rotation of the shaft 35 will move the blades 41 to "off" position. With the blades 37 and 41 both in the "off" position then the arm 34 may be swung laterally radially for engagement with any selected meter bar.

Figs. 8 and 9 illustrate another form of switch which consists of a retractible spring pressed pin 45 carried by a rotatable disk 46 mounted in a housing 47, which carries the meter fuse clips 48. In this instance the meter bus-bars 49 are arranged one over the other and over the neutral bar 50 vertically. To change the position of the switch blades 51, the pin 45 will be pulled outwardly until the blades 51 clear the bar; the disk 46 is then rotated until the blades 51 aline with the desired bar and then the pin 45 released to allow the spring to force the blades into contact with the bar.

Figs. 10 and 11 illustrate a form of switch consisting of a carrier 52 rotatably supported in a standard 53. In this form the meter bus-bars 54 and neutral bus-bar 55 are arranged in parallel, but the switch blades 56 are arranged in a radial formation, each bus-bar 54 having its arm switch blades. To throw in the various bus-bars the carrier 52 will be rotated until the proper set of blades 56 comes in contact with the desired bar. The carrier 52 supports a bushing 57 of insulating material upon which are mounted the neutral switch blades 58 and 59, the said blades being electrically connected by a sleeve 60. The blades 59 consist of disks (Fig. 11) which permanently contact with the terminal contact 61, the blades 58 being in the form of a spider having as many arms as there are blades 56.

The bus-bars are provided with contact surfaces 62, between recesses 63, which are for the purpose of allowing a blade to break contact with a bar before the next blade comes into contact.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. In a meter panel board a plurality of bus-bars, arranged side by side including meter bus-bars and a neutral bus-bar, a longitudinally movable and rotatable carrier adapted for movement across said bus-bars, a contact blade for the meter bars carried by said carrier, and a contact blade for the neutral bus bar loosely mounted upon said carrier but insulated therefrom.

2. In a meter panel board, a plurality of bus-bars, arranged side by side, a supporting bracket, a rotatable carrier slidably mounted in said bracket and adapted for longitudinal movement therein across said bus-bars, a contact blade for said bus-bars mounted upon said carrier, a neutral bus-bar, a sleeve carried by said carrier, means to rotatably connect said sleeve and said carrier, and a neutral contact blade carried by said sleeve and adapted to engage said neutral bus-bar.

3. In a meter panel board, a plurality of bus-bars, arranged side by side, a supporting bracket, a rotatable carrier slidably mounted in said bracket and adapted for longitudinal movement across said bus-bars, a contact blade for said bus-bars carried by said carrier, a neutral bus-bar, a sleeve loosely mounted upon said carrier, means to rotatably connect said sleeve and said carrier, a neutral contact blade carried by said sleeve adapted to engage said neutral bus-bar, and a bracket adapted to rotatably support said sleeve and to prevent the longitudinal movement thereof.

4. In a meter panel board, a plurality of bus-bars arranged side by side, a supporting bracket, a rotatable carrier slidably mounted in said bracket and adapted for longitudinal movement therein, a contact blade secured to said carrier, a locking device adapted to prevent the longitudinal movement of said carrier when the blade thereon is in contact with a bus-bar, and to permit the longitudinal movement of said carrier when said carrier has been rotated sufficiently to cause the blade thereon to clear the bus-bars, and a neutral contact blade carried by said carrier but insulated therefrom.

5. In a meter panel board a plurality of bus-bars including a neutral bus-bar arranged in alinement, a carrier adjacent thereto and adapted for movement transversely thereof, a support for said carrier, a contact blade secured to said carrier for selectively engaging said first bus-bars, and means mounted upon said carrier to engage the neutral bus-bar.

6. In a meter panel board a plurality of bus-bars arranged in alinement, a switch comprising a longitudinally slidable conductor adapted for movement across said bus-bars, switch blades for said bus-bars carried by said conductor, some of said blades being electrically connected to said conductor, and the remaining blades being insulated therefrom.

Signed at Brooklyn in the county of Kings and State of New York, this fourteenth day of January, one thousand nine hundred thirteen.

HUBERT F. KRANTZ.

Witnesses:
A. S. HENRY,
J. A. NEWTON.